(12) United States Patent
Shon et al.

(10) Patent No.: US 10,097,384 B2
(45) Date of Patent: Oct. 9, 2018

(54) EQUALIZATION CIRCUIT, SEMICONDUCTOR APPARATUS AND SEMICONDUCTOR SYSTEM USING THE SAME

(71) Applicant: SK hynix Inc., Icheon-si, Gyeonggi-do (KR)

(72) Inventors: Kwan Su Shon, Icheon-si Gyeonggi-do (KR); Yo Han Jeong, Icheon-si Gyeonggi-do (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 15/657,326

(22) Filed: Jul. 24, 2017

(65) Prior Publication Data

US 2017/0324592 A1    Nov. 9, 2017

Related U.S. Application Data

(62) Division of application No. 14/986,177, filed on Dec. 31, 2015, now Pat. No. 9,787,506.

(30) Foreign Application Priority Data

Aug. 31, 2015    (KR) ........................ 10-2015-0122993

(51) Int. Cl.
*H04L 25/03* (2006.01)
*H04L 25/06* (2006.01)

(52) U.S. Cl.
CPC .. *H04L 25/03267* (2013.01); *H04L 25/03146* (2013.01); *H04L 25/063* (2013.01)

(58) Field of Classification Search
CPC .................................................. H04L 25/03267
USPC .......................................................... 375/233
See application file for complete search history.

(56) References Cited

U.S. PATENT DOCUMENTS

| 4,477,913 A * | 10/1984 | Koya ...................... H04L 27/01 333/18 |
| 6,308,232 B1 | 10/2001 | Gasbarro |
| 7,701,257 B2 | 4/2010 | Bae |
| 9,277,421 B1 | 3/2016 | Petrovic et al. |
| 2003/0125922 A1 | 7/2003 | Grochowski et al. |
| 2005/0107045 A1 | 5/2005 | Kroeger |
| 2008/0101104 A1 | 5/2008 | Ikeda |
| 2009/0103669 A1 * | 4/2009 | Kolze ............... H04L 25/03019 375/346 |
| 2013/0069904 A1 | 3/2013 | Krah |

FOREIGN PATENT DOCUMENTS

KR    1020170013040 A    2/2017

* cited by examiner

*Primary Examiner* — Lihong Yu
(74) *Attorney, Agent, or Firm* — William Park & Associates Ltd.

(57) ABSTRACT

An equalization circuit may include a buffer configured to sense an input signal according to a reference voltage. The equalization circuit may include a reference voltage generator configured to generate the reference voltage. The reference voltage may be changed in conformity with noise of the input signal.

5 Claims, 7 Drawing Sheets

EQUALIZATION CIRCUIT, SEMICONDUCTOR APPARATUS AND SEMICONDUCTOR SYSTEM USING THE SAME

CROSS-REFERENCES TO RELATED APPLICATION

The present application is a divisional application of U.S. application Ser. No. 14/986,177, filed on Dec. 31, 2015, and claims priority under 35 U.S.C. § 119(a) to Korean application number 10-2015-0122993, filed on Aug. 31, 2015, in the Korean Intellectual Property Office, which is incorporated herein by reference in its entirety.

BACKGROUND

1. Technical Field

Various embodiments generally relate to an equalization circuit, and, more particularly, to an equalization circuit, a semiconductor apparatus and a semiconductor system using the same.

2. Related Art

To highly integrate a semiconductor apparatus, the semiconductor apparatus is manufactured with a plurality of chips (slices or dies) that are stacked.

Due to a plurality of chips being stacked, noise of an input signal becomes serious, and a capture margin may be decreased. As a result, input signal sensing performance may be degraded.

DETAILED DESCRIPTION

Various embodiments may be directed to an equalization circuit capable of stable input data sensing, and a semiconductor apparatus using the same.

In an embodiment, an equalization circuit may be provided. The equalization circuit may include a buffer configured to sense an input signal according to a reference voltage. The equalization circuit may include a reference voltage generator configured to generate the reference voltage. The reference voltage may be changed in conformity with noise of the input signal.

In an embodiment, an equalization circuit may be provided. The equalization circuit may include a buffer configured to sense an input signal according to a reference voltage. The equalization circuit may include a reference voltage generator configured to generate an equalization reference voltage which is changed in conformity with noise of the input signal, according to an equalization enable signal. The equalization circuit may include a multiplexer configured to output the equalization reference voltage or an external reference voltage as the reference voltage, according to the equalization enable signal.

In an embodiment, a semiconductor apparatus may be provided. The semiconductor apparatus may include a cell array, and a core block configured to write data in the cell array or read out data from the cell array. The semiconductor apparatus may include an enable control block configured to generate an equalization enable signal according to stack information. The stack information may include a number of semiconductor apparatuses in a stack. The semiconductor apparatus may include an equalization circuit configured to sense an input signal according to a reference voltage, and provide the sensed input signal to the core block, when the equalization enable signal is enabled.

In an embodiment, a semiconductor system may be provided. The semiconductor system may include a plurality of stacked semiconductor chips. The plurality of semiconductor chips may be stacked with one another. The semiconductor system may include a processor configured to access the plurality of stacked semiconductor chips. At least one of the plurality of stacked semiconductor chips may include an equalization circuit. The equalization circuit may be activated according to stack information, the stack information including a number of the semiconductor chips included in the stack.

In an embodiment, an equalization circuit may be provided. The equalization circuit may include a buffer configured to sense an input signal according to a reference voltage. The equalization circuit may include a reference voltage generator configured to generate an equalization reference voltage which is changed in conformity with noise of the input signal, according to an equalization enable signal. The equalization circuit may include a multiplexer configured to output the equalization reference voltage or an external reference voltage as the reference voltage, according to the equalization enable signal. The equalization circuit may include a feedback delay compensator configured to delay an output signal of the buffer by a predetermined time such that a variation of the reference voltage is applied after 1 unit interval (UI) from an input time of the input signal.

In an embodiment, an equalization circuit may be provided. The equalization circuit may include a buffer configured to receive an input signal according to a reference voltage. The equalization circuit may include a reference voltage generator configured to change a level of the reference voltage in conformity with a level variation of the input signal.

Hereinafter, an equalization circuit, a semiconductor apparatus and a semiconductor system using the same will be described below with reference to the accompanying drawings through various examples of embodiments.

Various embodiments may use an equalization circuit capable of compensating for input signal sensing performance degradation due to noise.

Figure 1:
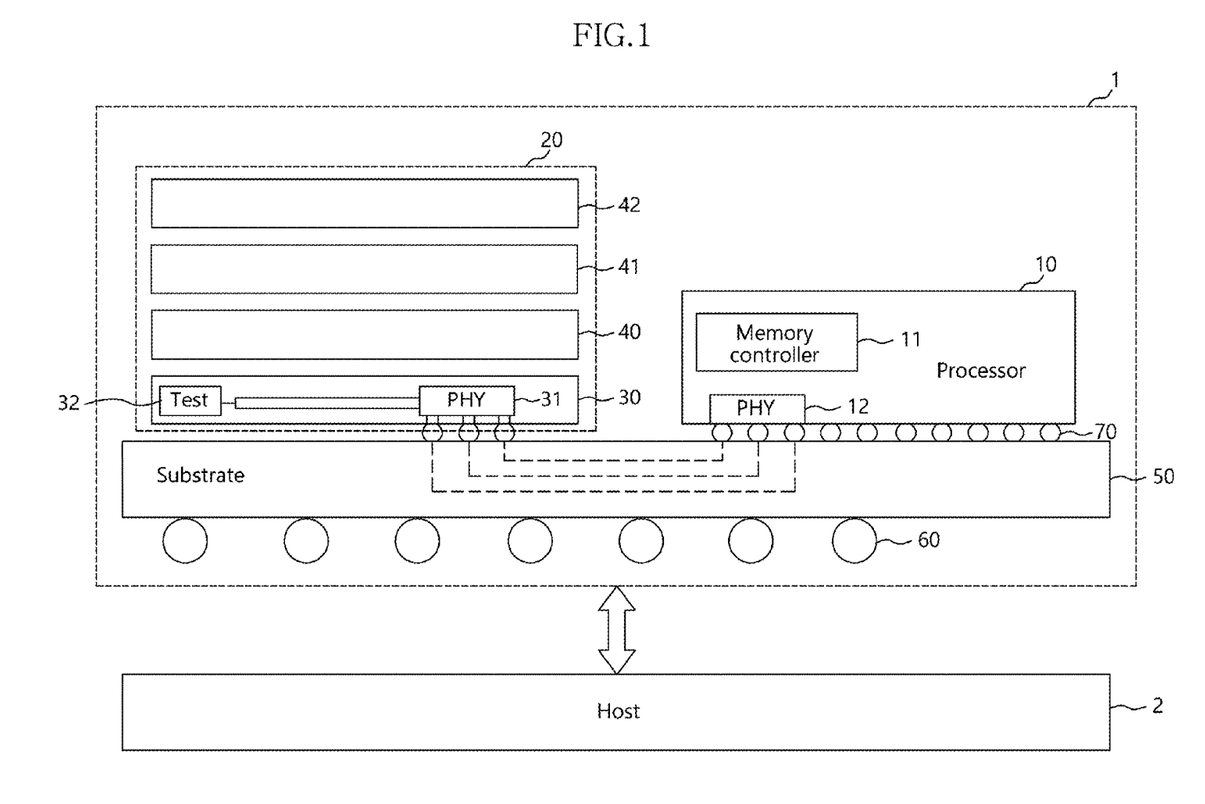
FIG. 1 is a diagram illustrating a representation of an example of the configuration of a semiconductor system 1 in accordance with an embodiment.

Referring to FIG. 1, a semiconductor system 1 in accordance with an embodiment may include a substrate 50, a stacked semiconductor memory 20, and a processor 10.

The semiconductor system 1 may be realized in the type of a system-in-package, a multi-chip package or a system-on-chip, and may be realized in the type of a package-on-package including a plurality of packages.

The substrate 50 may provide signal paths for smooth data communication between the processor 10 and the stacked semiconductor memory 20, and may include an additional logic circuit for providing the signal paths and a logic circuit for a test.

The substrate 50 may be realized in various types such as of an interposer and a PCB (printed circuit board). The signal paths provided by the substrate 50 may include electrical coupling paths such as metal layers or through-silicon vias.

The substrate 50 may be electrically coupled with an external device through package balls 60 such as a ball grid array, bump balls and C4 bumps. The external device may be a host 2 which operates by being coupled with the semiconductor system 1.

The substrate 50 may be electrically coupled with the processor 10 and the stacked semiconductor memory 20 through micro bumps 70.

The processor 10 may communicate with the host 2 through a system bus (not illustrated) and the substrate 50, and may perform various calculation operations required by the host 2.

The processor 10 may include at least one among a central processing unit (CPU), a graphic processing unit (GPU), a multimedia processor (MMP) and a digital signal processor (DSP).

The processor 10 may be realized in the types of a system-on-chip, a system-in-package and a package-on-package in which processor chips having various functions, such as application processors (AP), are combined.

The processor 10 may access the stacked semiconductor memory 20 through a memory controller 11.

A physical layer PHY 12 of the memory controller 11 and a physical layer PHY 31 of the stacked semiconductor memory 20 may convert signals to be exchanged between them, in conformity with the interface between them.

While the present embodiments illustrate an example in which the memory controller 11 is disposed in the processor 10, it is to be noted that, as the case may be, the memory controller 11 may be separately disposed outside the processor 10.

The memory controller 11 may be stacked as any one chip (a base chip or a logic chip) of the stacked semiconductor memory 20.

The memory controller 11 may be separately stacked on the substrate 50 by being separated from the stacked semiconductor memory 20 and the processor 10.

The memory controller 11 may provide a command, an address, a clock and data to the stacked semiconductor memory 20 to control the stacked semiconductor memory 20, and may receive data outputted from the stacked semiconductor memory 20.

The physical layers 12 and 31 may be interface circuits which convert a signal transmitted from the processor 10 or the memory controller 11 into a signal appropriate to be used in the stacked semiconductor memory 20 and output the converted signal or which convert a signal transmitted from the stacked semiconductor memory 20 into a signal appropriate to be used in the processor 10 or the memory controller 11.

The stacked semiconductor memory 20 may be a stacked memory device including a plurality of stacked chips.

The stacked semiconductor memory 20 may include a logic chip 30 and a plurality of memory chips 40 to 42 which are sequentially stacked on the logic chip 30.

The logic chip 30 and the plurality of memory chips 40 to 42 may be electrically coupled through through vias or bonding wires.

The logic chip 30 may relay signal and data transmissions between the memory controller 11 and the plurality of memory chips 40 to 42.

The logic chip 30 may include the physical layer 31, a test circuit 32 and a repair-related circuit (not illustrated).

The physical layer 31 may receive a signal and data transmitted through the processor 10 or the memory controller 11 and the physical layer 12, and may amplify signals and data outputted from the plurality of memory chips 40 to 42 and transmit the amplified signals and data to the physical layer 12.

The test circuit 32 may perform tests for the plurality of memory chips 40 to 42 by being coupled with the processor 10 or the memory controller 11, or may perform tests for the plurality of memory chips 40 to 42 by being coupled with the host 2, for example, test equipment. The test circuit 32 may independently perform a test for the stacked semiconductor memory 20.

The test circuit 32 may include circuits which may perform tests associated with the plurality of memory chips 40 to 42 and the logic chip 30 at a wafer level and a package level.

The test circuit 32 may include various memory test-related circuits such as a built-in self test circuit, a self repair circuit and a self stress circuit.

The test circuit 32 may perform a couplability test of through vias or micro bumps, a boundary scan test, a burn-in stress test, a data input/output test, a data compression test, and so on.

The test circuit 32 may include a repair logic which replaces a failed memory cell with a redundancy memory cell.

The plurality of memory chips 40 to 42 may respectively have data storage spaces for storing data transmitted through the logic chip 30 from the processor 10 or the memory controller 11.

The plurality of memory chips 40 to 42 may further include logic circuits for performing tests in link with the test circuit 32 of the logic chip 30.

The logic chip 30 and the plurality of memory chips 40 to 42 may be configured by a DRAM or a NAND flash.

While it is illustrated as an example that the stacked semiconductor memory 20 is configured by 4 chips, that is, the logic chip 30 and the plurality of memory chips 40 to 42 which are sequentially stacked on the logic chip 30, it is to be noted that an increased number of chips may be stacked.

Each of the chips of the stacked semiconductor memory 20 may be configured by a DRAM or a NAND flash.

Each of the chips of the stacked semiconductor memory 20 may include an equalization circuit for compensating for deterioration in performance for sensing an input signal.

Whether the equalization circuit is to be activated or not may be determined according to an inter symbol interference (ISI) characteristic degradation including a resistance-capacitance (RC) characteristic degradation of a channel which couples the stacked semiconductor memory 20 and the processor 10.

Whether the equalization circuit is to be activated or not may be determined according to the stack number of chips of the stacked semiconductor memory 20.

Figure 2:
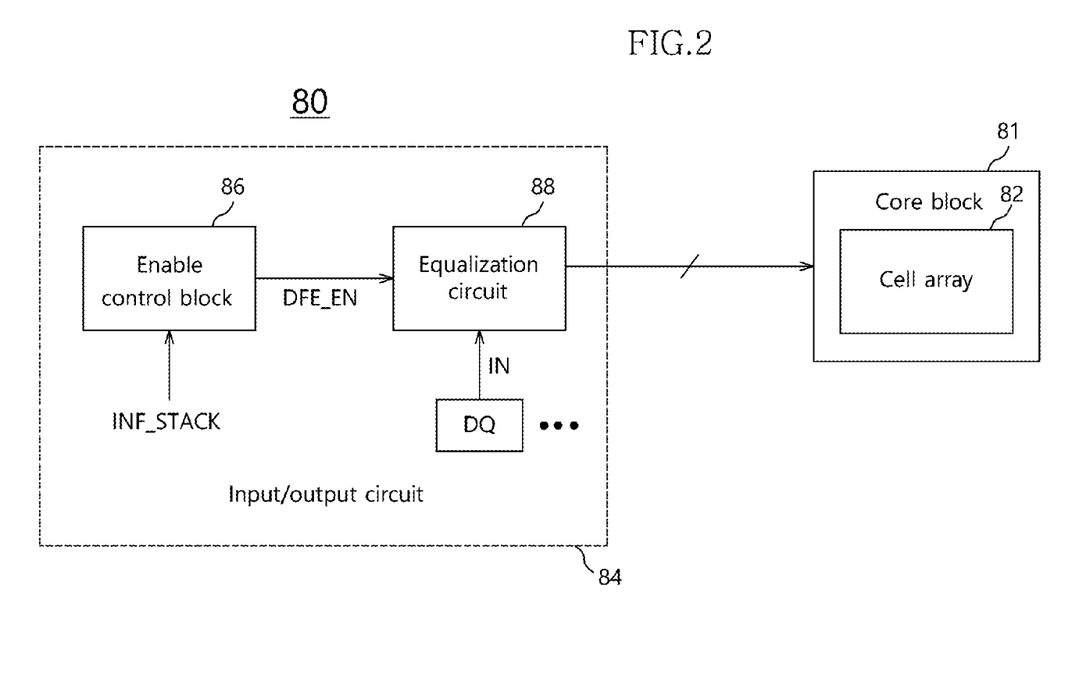
FIG. 2 is a diagram illustrating a representation of an example of the configuration of a semiconductor apparatus 80 in accordance with an embodiment.

The logic chip 30 or each of the plurality of memory chips 40 to 42 in the stacked semiconductor memory 20 of FIG. 1 may be configured in the same way as a semiconductor apparatus 80 of FIG. 2.

Referring to FIG. 2, the semiconductor apparatus 80 in accordance with an embodiment may include a core block 81 and an input/output circuit 84.

The core block 81 may include a cell array 82 and row paths and column paths for writing data in the cell array 82 or reading out data from the cell array 82.

The cell array 82 may be divided into unit memory blocks of a small unit, for example, mats, or unit memory blocks of a large unit, for example, banks.

The input/output circuit 84 may perform an operation of processing input/output data of the core block 81.

The input/output circuit 84 may include input/output terminals DQ, an enable control block 86, an equalization circuit 88, and circuit configurations (not illustrated) for data input/output processing through the input/output terminals DQ.

The enable control block 86 may generate an equalization enable signal DFE_EN according to a stack information INF_STACK.

The stack information INF_STACK may include information on the number of semiconductor apparatuses 80 that are stacked.

When taking the stacked semiconductor memory 20 of FIG. 1 as an example, since 4 semiconductor chips are stacked, the stack information INF_STACK may have a value corresponding to '4'.

If the semiconductor apparatus 80 of FIG. 2 had 8 or 16 stacked semiconductor chips included in the stacked semiconductor memory 20, then the stack information INF_STACK may have a value corresponding to '8' or '16', respectively.

The enable control block 86 may enable the equalization enable signal DFE_EN when, for example, the stack information INF_STACK is equal to or greater than a predetermined value.

In the example where the semiconductor apparatus 80 is stacked with at least one other semiconductor apparatus 80, for example, 2 or more, noise, in particular, ISI, of an input signal may become serious to the extent that an influence is likely to be exerted on sensing of an input signal.

Therefore, in the example where the stack information INF_STACK has a value equal to or greater than 2, the enable control block 86 may enable the equalization enable signal DFE_EN such that the equalization circuit 88 operates.

In an example where the semiconductor apparatus 80 is a single chip, ISI induced therein may not exert any influence on sensing of an input signal.

Therefore, in the example where the stack information INF_STACK has the value of '1,' the enable control block 86 may disable the equalization enable signal DFE_EN such that the equalization circuit 88 does not operate and thereby current consumption is reduced.

The equalization circuit 88 may sense an input signal IN by using an equalization operation during an enable period of the equalization enable signal DFE_EN, and provide a resultant signal to the core block 81.

Figure 3:
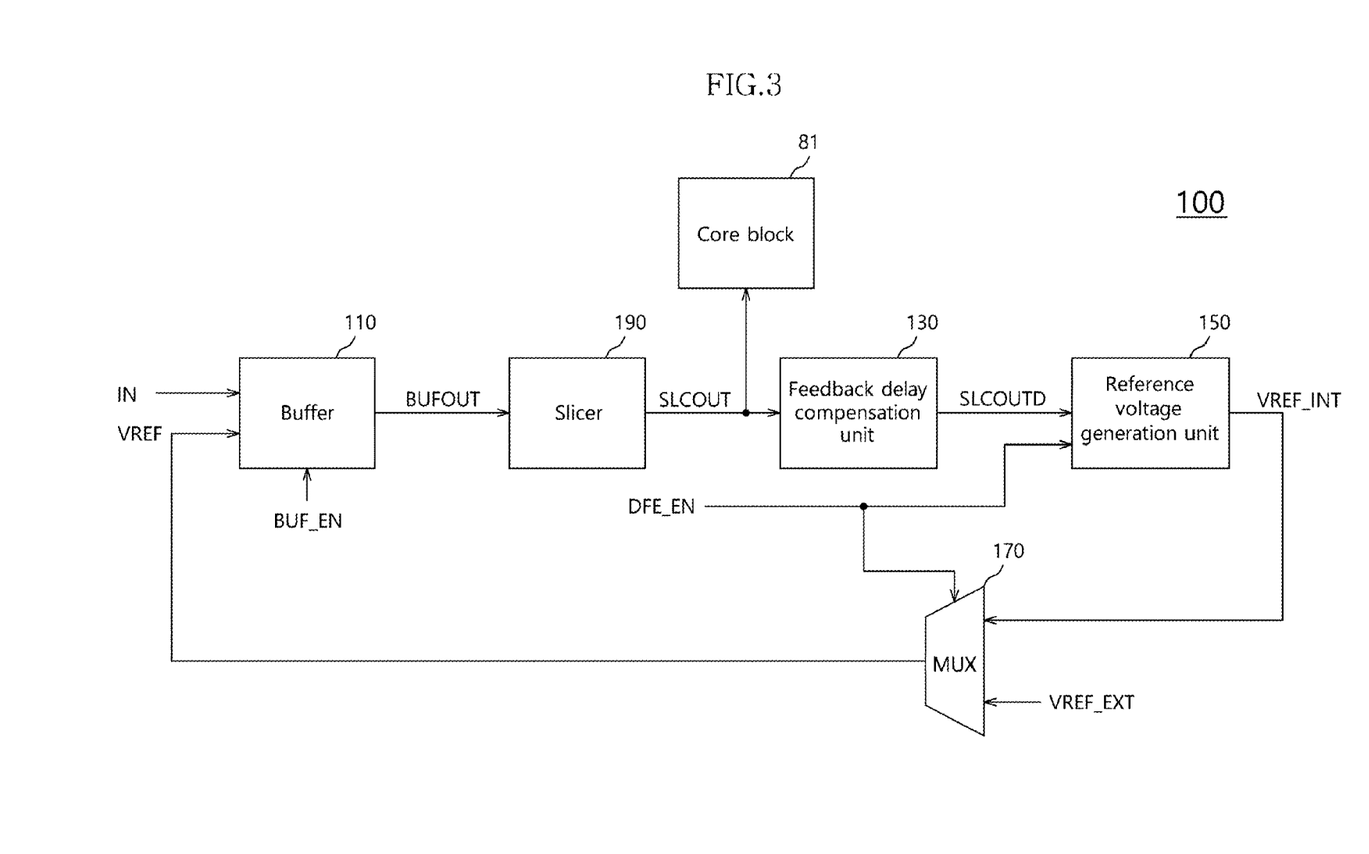
FIG. 3 is a block diagram illustrating a representation of an example of an equalization circuit 100 in accordance with an embodiment.

The equalization circuit 88 of FIG. 2 may be realized in, for example, as the type illustrated in FIG. 3.

Referring to FIG. 3, an equalization circuit 100 in accordance with an embodiment may include a decision feedback equalizer (DFE).

The equalization circuit 100 in accordance with an embodiment may include a buffer 110 and a reference voltage generator 150.

An equalization circuit 100 may further include a feedback delay compensator 130, a multiplexer 170, and a slicer 190.

The buffer 110 may sense an input signal IN according to a reference voltage VREF during an enable period of a buffer enable signal BUF_EN, and generate an output signal BUFOUT.

The reference voltage generator 150 may be configured to generate an equalization reference voltage VREF_INT by using an input signal SLCOUTD for an enable period of an equalization enable signal DFE_EN.

The reference voltage generator 150 may be configured using a filter, for example, an infinite impulse response (IIR) filter.

Since the IIR filter operates to track the waveform of an input signal, the waveform of the output of the IIR filter may be changed to conform to an input signal in which noise, for example, ISI is included.

Accordingly, the reference voltage generator 150 may generate the equalization reference voltage VREF_INT which may be changed in conformity with noise of an input signal.

The slicer 190 may convert the output signal BUFOUT of the buffer 110 into a logic level, for example, a CMOS level, and generate an output signal SLCOUT.

The output signal SLCOUT of the slicer 190 may be provided to the core block 81 of FIG. 2, as a result of sensing the input signal IN.

The feedback delay compensator 130 may delay the output signal SLCOUT of the slicer 190 by a predetermined time and output a delayed signal SLCOUTD such that change of the equalization reference voltage VREF_INT by the reference voltage generator 150 is applied after 1 unit interval (UI) from an input time of the input signal IN.

The unit interval (UI) may mean a unit data output time.

The multiplexer 170 may output the equalization reference voltage VREF_INT or an external reference voltage VREF_EXT as the reference voltage VREF according to the equalization enable signal DFE_EN.

Figure 4:
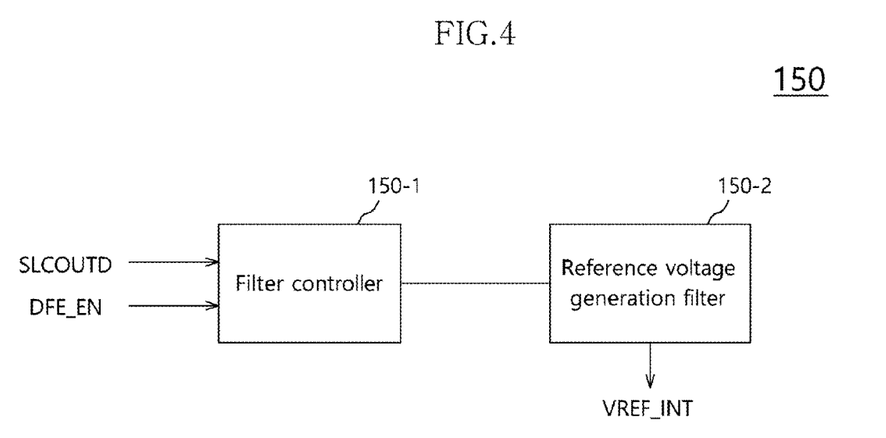
FIG. 4 is a diagram illustrating a representation of an example of the configuration of the reference voltage generator 150 illustrated in FIG. 3.

Referring to FIG. 4, the reference voltage generator 150 of FIG. 3 may include a filter controller 150-1 and a reference voltage generation filter 150-2.

The reference voltage generation filter 150-2 may generate the equalization reference voltage VREF_INT according to the control of the filter controller 150-1.

The filter controller 150-1 may control current according to a power supply voltage applied to the reference voltage generation filter 150-2, by using the input signal, that is, the delayed signal SLCOUTD, during the enable period of the equalization enable signal DFE_EN.

Figure 5:
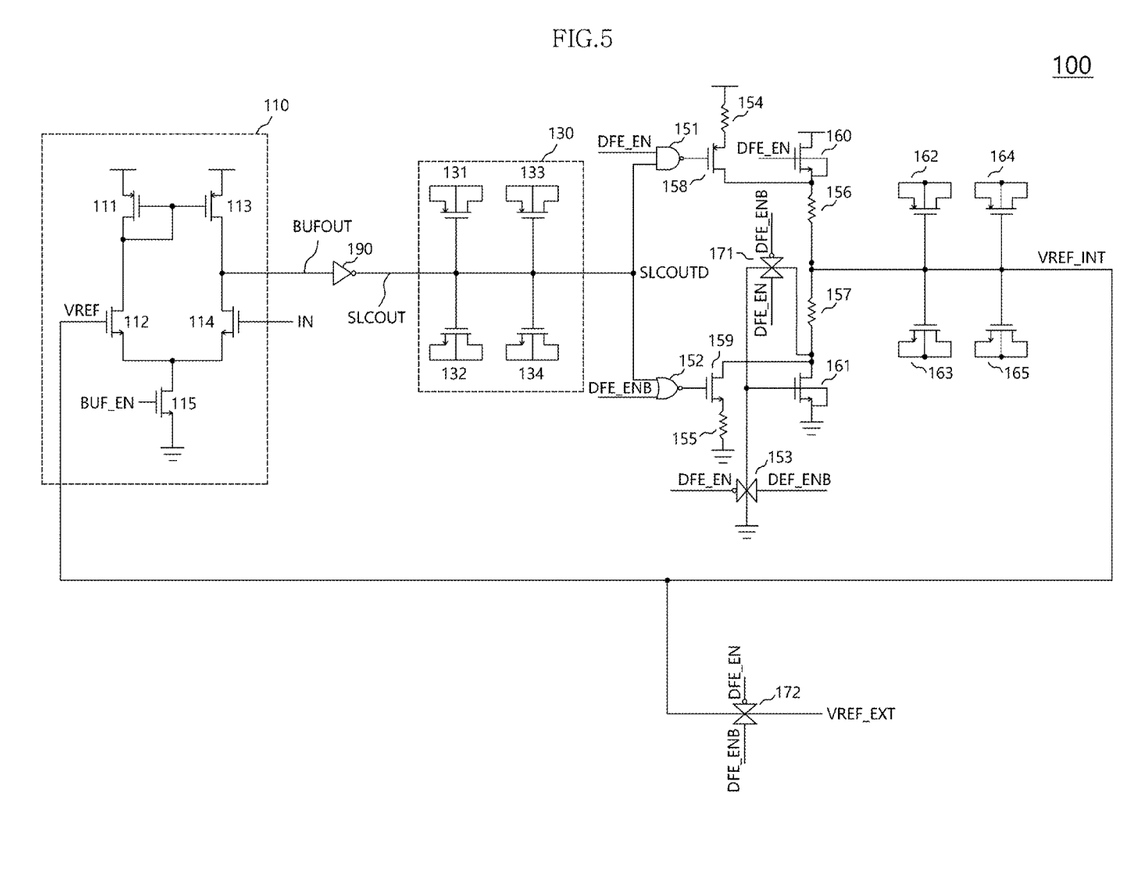
FIG. 5 is a circuit diagram illustrating a representation of an example of the equalization circuit 100 illustrated in FIG. 3.

Referring to FIG. 5, the buffer 110 of the equalization circuit 100 in accordance with the embodiment may be configured as a pseudo differential buffer.

The buffer 110 may include first to fifth transistors 111 to 115.

The first transistor 111 may have a source coupled with a power supply terminal, and a gate coupled with a drain of the first transistor 111 itself.

The second transistor 112 may have a source coupled with the drain of the first transistor 111, and a gate configured to be inputted with the reference voltage VREF.

The third transistor 113 may have a source coupled with the power supply terminal, and a gate coupled with the gate of the first transistor 111.

The fourth transistor 114 may have a source coupled with a drain of the third transistor 113, and a gate configured to be inputted with the input signal IN.

The fifth transistor 115 may have a source coupled in common with a drain of the second transistor 112 and a drain of the fourth transistor 114, a drain coupled with a ground terminal, and a gate to which the buffer enable signal BUF_EN is applied.

The output signal BUFOUT may be generated from a node where the drain of the third transistor 113 and the source of the fourth transistor 114 are coupled.

The slicer 190 may be constructed by an inverter.

The slicer 190 may invert the output signal BUFOUT of the buffer 110, and generate the output signal SLCOUT.

The feedback delay compensator 130 may delay the output signal SLCOUT of the slicer 190 by the predetermined time, and generate the output signal SLCOUTD.

The feedback delay compensator 130 may include first to fourth capacitors 131 to 134 coupled in parallel with the output signal line of the slicer 190.

The first to fourth capacitors 131 to 134 may be constructed using MOS transistors.

The reference voltage generator 150 may include a filter controller 151 to 153 and a reference voltage generation filter 154 to 165.

The reference voltage generation filter 154 to 165 may be constructed by combining an IIR filter to a reference voltage generation circuit.

The reference voltage generation filter 154 to 165 may include first to fourth resistors 154 to 157, first to fourth transistors 158 to 161, and first to fourth capacitors 162 to 165.

The third and fourth transistors 160 and 161 and the third and fourth resistors 156 and 157 may operate as the reference voltage generation circuit.

The first resistor 154 may have one end coupled with the power supply terminal and the other end which is coupled with a source of the first transistor 158.

The first transistor 158 may have a drain coupled with a source of the third transistor 160.

The second resistor 155 may have one end coupled with the ground terminal and the other end coupled with a source of the second transistor 159.

The second transistor 159 may have a drain coupled with a drain of the fourth transistor 161.

The third transistor 160 may have a drain coupled with the power supply terminal, the source coupled with one end of the third resistor 156, and a gate configured to be inputted with the equalization enable signal DFE_EN.

The other end of the third resistor 156 may be coupled with one end of the fourth resistor 157.

The other end of the fourth resistor 157 may be coupled with the drain of the fourth transistor 161.

The fourth transistor 161 may have a source coupled with the ground terminal.

The first to fourth capacitors 162 to 165 may be coupled in parallel with a coupling node of the third resistor 156 and the fourth resistor 157.

The filter controller 151 to 153 may control the activation of the reference voltage generation filter 154 to 165 according to the equalization enable signal DFE_EN.

The filter controller 151 to 153 may activate the reference voltage generation filter 154 to 165 by providing the input signal IN, that is, the output signal SLCOUTD of the feedback delay compensator 130, to the reference voltage generation filter 154 to 165, according to the equalization enable signal DFE_EN.

The filter controller 151 to 153 may include first and second logic gates 151 and 152 and a switch 153.

The first logic gate 151 may invert the output signal SLCOUTD of the feedback delay compensator 130 and output a resultant signal, in the case where the equalization enable signal DFE_EN has an enable level (a high level).

The output of the first logic gate 151 may be applied to the gate of the first transistor 158 of the reference voltage generation filter 154 to 165.

The second logic gate 152 may invert the output signal SLCOUTD of the feedback delay compensator 130 and output a resultant signal, in the case where an equalization enable bar signal DFE_ENB has an enable level (a low level).

The equalization enable bar signal DFE_ENB may be a signal which has a logic level opposite to the equalization enable signal DFE_EN.

The output of the second logic gate 152 may be applied to the gate of the second transistor 159 of the reference voltage generation filter 154 to 165.

The switch 153 may be constructed by a transmission gate, and may couple the ground terminal to a gate of the fourth transistor 161 of the reference voltage generation filter 154 to 165 in the case where the equalization enable signal DFE_EN is a low level.

The multiplexer 170 may include first and second switches 171 and 172.

The first switch 171 may couple the gate and the drain of the fourth transistor 161 of the reference voltage generation filter 154 to 165 in the case where the equalization enable signal DFE_EN is the high level.

The second switch 172 may output the external reference voltage VREF_EXT as the reference voltage VREF in the case where the equalization enable signal DFE_EN is the low level.

The operation of the equalization circuit 100 in accordance with an embodiment, configured as mentioned above, will be described below.

First, the operation of the equalization circuit 100 in the case where the equalization enable signal DFE_EN is the low level will be described.

Since the equalization enable signal DFE_EN is the low level, the first to fourth transistors 158 to 161 are turned off, the switch 153 couples the gate of the fourth transistor 161 and the ground terminal, and the first switch 171 of the multiplexer 170 blocks coupling of the gate and the drain of the fourth transistor 161.

By the above operations, an equalization function is interrupted as the current path of the reference voltage generation filter 154 to 165 is blocked.

The second switch 172 of the multiplexer 170 provides the external reference voltage VREF_EXT as the reference voltage VREF to the buffer 110.

In the state in which the equalization function is interrupted, the buffer 110 may generate the output signal BUFOUT by amplifying the input signal IN according to the reference voltage VREF, and the signal SLCOUT having passed through the slicer 190 may be provided to the core block 81 of FIG. 2 as a result of sensing the input signal IN.

Next, the operation of the equalization circuit 100 in the case where the equalization enable signal DFE_EN is the high level will be described.

Since the equalization enable signal DFE_EN is the high level, the equalization reference voltage VREF_INT may be generated to a preset level, for example, a level corresponding to the power supply voltage/2, by the third and fourth transistors 160 and 161 and the third and fourth resistors 156 and 157.

Thereafter, the buffer 110 may amplify the input signal IN according to the reference voltage VREF, and generate the output signal BUFOUT.

The output signal BUFOUT of the buffer 110 may be amplified to a CMOS level through the slicer 190, and be applied to the first and second logic gates 151 and 152 by passing through the feedback delay compensator 130.

The reference voltage generation filter 154 to 165 may variably output the equalization reference voltage VREF_INT in conformity with a level variation of the input signal IN, that is, a level variation of the output signal SLCOUTD of the feedback delay compensator 130, to correspond to a response characteristic of the IIR filter.

A level variation of the input signal IN may occur by noise, in particular, ISI attributable to stacking of a plurality of semiconductor chips.

The reference voltage generation filter 154 to 165 is configured by combining the IIR filter, and the IIR filter has a response characteristic similar to noise, for example, ISI, of an input signal.

Accordingly, the reference voltage generation filter 154 to 165 may generate the equalization reference voltage VREF_INT which may be changed in conformity with noise of an input signal.

Figure 6:
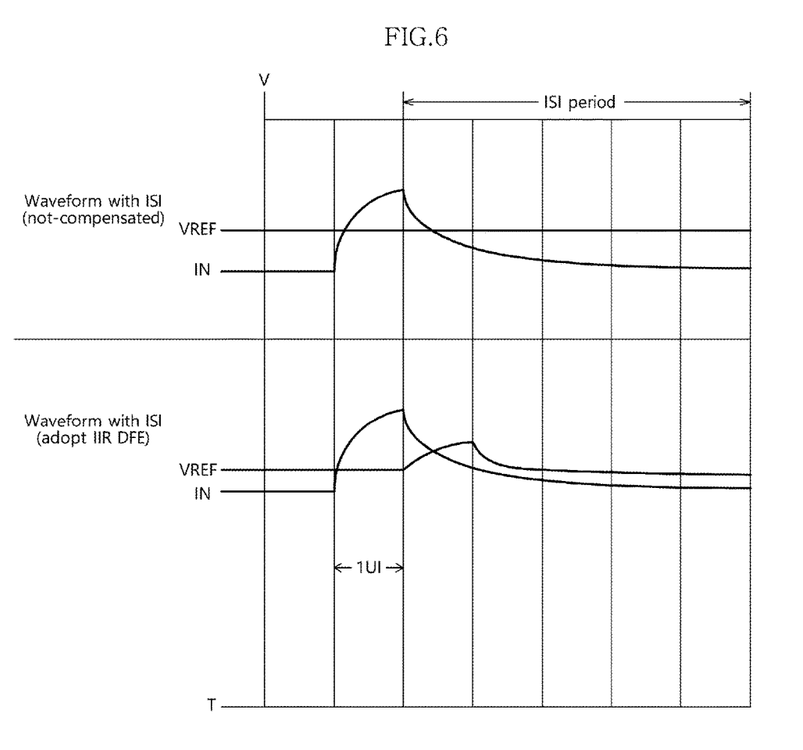
FIG. 6 is a representation of an example of a simulation waveform diagram according to an application of the equalization circuit 100 in accordance with an embodiment.

Referring to FIG. 6, in the case where an equalization function is not adopted (i.e. Waveform with ISI (not-compensated)), the input signal IN is distorted by ISI, and the reference voltage VREF is constantly retained at a certain level regardless of a level variation of the input signal IN.

In an embodiment, in the case where the equalization function using the IIR filter is adopted (i.e., Waveform with ISI (adopt IIR DFE)), the reference voltage VREF may be changed in conformity with a level variation of the input signal IN by tracking the input signal IN, from after the predetermined time, for example, 1 unit interval (UI) has passed after the level variation of the input signal IN occurs.

Since the level of the reference voltage VREF is changed in conformity with a level variation of the input signal IN, input signal sensing performance may be improved.

Figure 7:
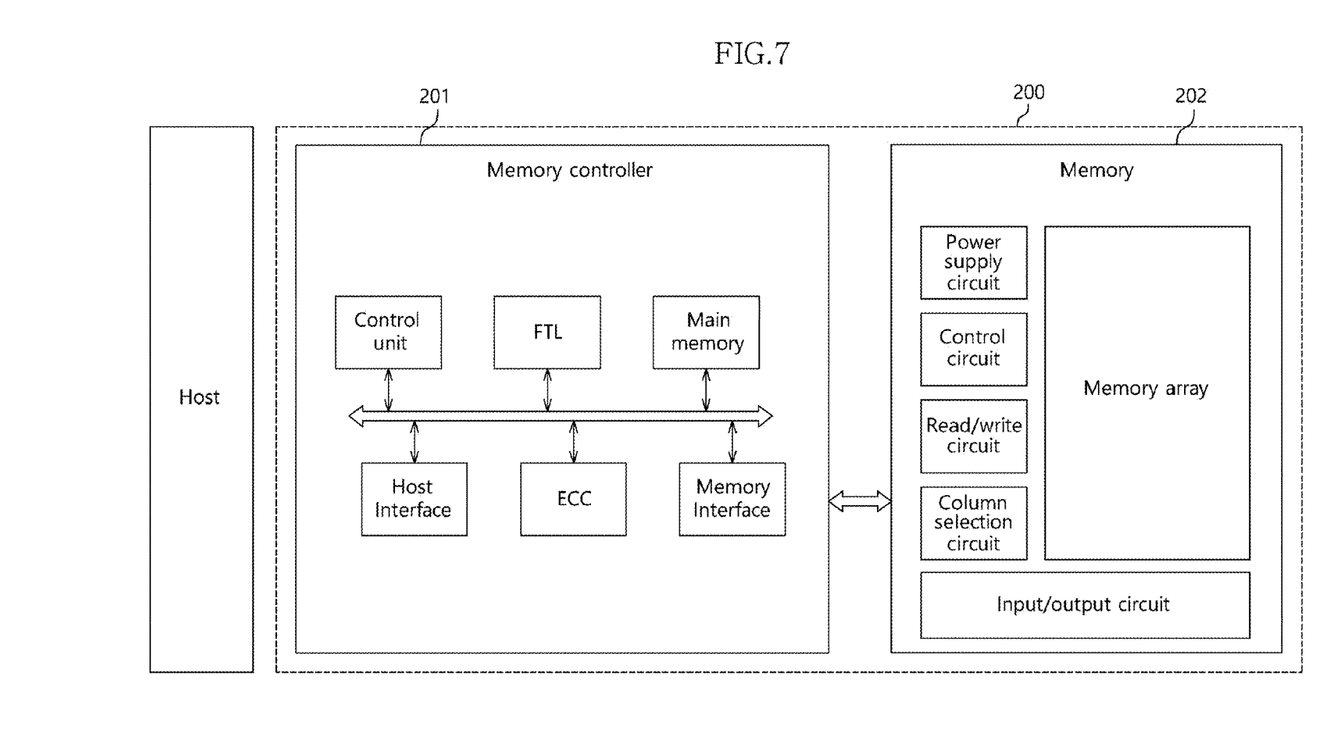
FIG. 7 is a diagram illustrating a representation of an example of the configuration of a semiconductor system 200 in accordance with an embodiment.

Referring to FIG. 7, a semiconductor system 200 in accordance with an embodiment may include a memory controller 201 and a memory 202.

The memory 202 may include the equalization circuit described above with reference to FIGS. 3 to 6.

Whether the equalization circuit is to be activated or not may be determined according to an ISI characteristic degradation including an RC characteristic degradation of a channel which couples the memory 202 and the memory controller 201.

The memory controller 201 may control the memory 202. The memory controller 201 may exchange data, etc. with a host through a host interface, and may exchange data, etc. with the memory 202 through a memory interface. The memory controller 201 may include a control unit, a main memory, an error correction code unit (ECC), the host interface, a flash translation layer (FTL), and the memory interface. These components may be coupled with one another through a bus. The memory controller 201 may access the memory 202 in response to a request from the host. The memory controller 201 may control operations (for example, read, write and erase operations) of the memory 202, and drive a firmware for controlling the memory 202.

The control unit may be configured to control general operations of the memory controller 201. The control unit may control operations of function units inside the memory controller 201 according to a firmware or a software. Also, the control unit may control an operation of the memory 202 in response to a request from the host.

The main memory may be configured to store a firmware or a software to be driven according to the control of the control unit or store data necessary for driving of the firmware or the software. The main memory may be used as a working memory of the control unit. The main memory may store data write-requested from the host, or store data read out from the memory 202. The main memory may be used as a data buffer memory (or a data cache memory). By a data buffering operation (or a data caching operation) of the main memory, the memory controller 201 may quickly respond to a request from the host. The main memory may be configured to store parameters in association with operation conditions of the memory 202. The parameters may be provided from the memory 202 to the memory controller 201. When power starts to be supplied from an exterior, parameters may be provided from the memory 202, and the provided parameters may be stored in the main memory. The memory controller 201 may control operations (for example, a program operation, a read operation and an erase operation) of the memory 202 under conditions set according to the parameters stored in the main memory. In an embodiment, the main memory may be realized by a volatile memory such as an SRAM (static RAM), a DRAM (dynamic RAM) and an SDRAM (synchronous DRAM). In an embodiment, the main memory may be realized by a nonvolatile random access memory such as an FRAM (ferroelectric RAM), an MRAM (magnetic RAM), a PCRAM (phase change RAM) and an ReRAM (resistive RAM). While it is illustrated in FIG. 7 that the main memory is included in the memory controller 201, it is to be noted that the main memory may be configured outside the memory controller 201.

The host interface may be configured to intercouple the host and the memory controller 201. For example, the host interface may be configured to communicate with the host through at least one of various interface protocols such as a multimedia card (MMC) protocol, a universal flash storage (UFS) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI express (PCI-E) protocol, a secure digital (SD) protocol and a universal serial bus (USB) protocol.

The flash translation layer may provide various control means which are based on characteristics of the memory 202. For example, the flash translation layer may provide means for translating a logical address received from the host into a physical address of the memory 202. The flash translation layer may table and retain information on mapping relationships between logical addresses and physical addresses. The flash translation layer may provide means for controlling program and erase counts of memory blocks of the memory 202 to be uniformized. For example, the flash translation layer may provide wear leveling means. The flash translation layer may provide means for minimizing the erase count of the memory 202. For example, the flash translation layer may provide control means such as for merge and garbage collection.

The memory interface may be configured to intercouple the memory controller 201 and the memory 202. The memory interface may be configured to provide control signals (for example, commands and addresses) to the memory 202. The memory interface may exchange data with the memory 202.

The error correction code unit may perform an encoding operation of adding parity data to data to be written in the memory 202, and perform a decoding operation of detecting and correcting an error in data read out from the memory 202, based on the parity data. The error correction code unit may correct an error in data, by using an error correction code algorithm such as an LDPC (low density parity check) code, a BCH (Bose, Chaudhuri, Hocquenghem) code, a turbo code and a Reed-Solomon code. While it is illustrated in FIG. 7 that the error correction code unit is disposed in the memory controller 201, it is to be noted that the error correction code unit may be disposed outside the memory controller 201.

In an embodiment, the memory controller 201 and the memory 202 may be realized as separate chips, respectively. In an embodiment, the memory controller 201 and the memory 202 may be realized as one chip. For example, the memory controller 201 and the memory 202 may be configured by a multimedia card in the form of MMC, eMMC, RS-MMC and MMC-micro, a universal flash storage (UFS) device, a solid state drive (SSD), a secure digital card in the form of SD, mini-SD and micro-SD, a compact flash (CF) card, a smart media card, a universal serial bus (USB) storage device, or a memory stick.

Furthermore, the memory controller 201 and the memory 202 may be realized as any one among various kinds of packages. For example, the memory controller 201 and the memory 202 may be realized as any one among package types such as a package-on-package (POP), a chip-on-board (COB), a system-in-package (SIP), a multi-chip package (MCP), a wafer-level fabricated package (WFP) and a wafer-level processed stack package (WSP).

While various embodiments have been described above, it will be understood to those skilled in the art that the embodiments described are examples only. Accordingly, the equalization circuit, the semiconductor apparatus and the semiconductor system using the same described herein should not be limited based on the described embodiments.

What is claimed is:

1. A semiconductor apparatus comprising:
    a memory cell array, and a core block configured to write data in the memory cell array or read out data from the memory cell array;
    an enable control block configured to generate an equalization enable signal according to stack information, the stack information including a number of semiconductor apparatuses in a stack; and
    an equalization circuit configured to generate a reference voltage according to a delayed input signal, equalize an input signal according to the reference voltage, and provide the equalized input signal to the core block, when the equalization enable signal is enabled,
    wherein the equalization circuit includes a feedback delay compensator configured to generate the delayed input signal by delaying the input signal by a predetermined time.

2. The semiconductor apparatus according to claim 1, wherein the enable control block enables the equalization enable signal when the number of semiconductor apparatuses stacked is equal to or greater than a preset number.

3. The semiconductor apparatus according to claim 1, wherein the equalization circuit is configured to internally generate the reference voltage, the reference voltage changed in conformity with noise of the input signal, and sense the input signal according to the reference voltage.

4. The semiconductor apparatus according to claim 1, wherein the equalization circuit comprises:
    a buffer configured to sense the input signal according to the reference voltage; and
    a reference voltage generator configured to generate the reference voltage, the reference voltage changed in conformity with noise of the input signal.

5. The semiconductor apparatus according to claim 4, wherein the reference voltage generator comprises:
    a reference voltage generation circuit configured to generate the reference voltage; and
    a filter configured to have a response characteristic conforming to noise of the input signal, and change a level of the reference voltage according to the response characteristic.

* * * * *